(12) United States Patent
Roblek et al.

(10) Patent No.: US 10,460,747 B2
(45) Date of Patent: Oct. 29, 2019

(54) FREQUENCY BASED AUDIO ANALYSIS USING NEURAL NETWORKS

(71) Applicant: Google LLC, Mountain View, CA (US)

(72) Inventors: Dominik Roblek, Meilen (CH); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 586 days.

(21) Appl. No.: 15/151,362

(22) Filed: May 10, 2016

(65) Prior Publication Data

US 2017/0330586 A1    Nov. 16, 2017

(51) Int. Cl.
*G06N 3/04*     (2006.01)
*G06N 3/08*     (2006.01)
*G10L 25/30*    (2013.01)
*G06F 11/07*    (2006.01)

(52) U.S. Cl.
CPC ............ *G10L 25/30* (2013.01); *G06F 11/079* (2013.01); *G06F 11/0715* (2013.01); *G06N 3/0454* (2013.01); *G06N 3/088* (2013.01)

(58) Field of Classification Search
None
See application file for complete search history.

(56) References Cited

U.S. PATENT DOCUMENTS

2013/0094782 A1*  4/2013  Weston .................. G06T 3/4007
                                                                       382/300
2015/0032449 A1   1/2015  Sainath et al.
2015/0161522 A1   6/2015  Saon et al.
2015/0161995 A1   6/2015  Sainath et al.
2015/0255062 A1   9/2015  Penn et al.
2016/0063359 A1   3/2016  Szegedy et al.
2016/0350649 A1* 12/2016  Zhang ................... G06N 3/0454
2017/0140260 A1*  5/2017  Manning ................. G06N 3/04

(Continued)

OTHER PUBLICATIONS

"Learning Spatiotemporal Features with 3D Convolutional Networks," Du Tran, Lubomir Bourdev, Rob Fergus, Lorenzo Torresani, Manohar Paluri, Dartmouth College, ICCV '15 Proceedings of the 2015 IEEE International Conference on Computer Vision, pp. 4489-4497, Dec. 2015 (Year: 2015).*

(Continued)

*Primary Examiner* — Hal Schnee
(74) *Attorney, Agent, or Firm* — Fish & Richardson P.C.

(57) ABSTRACT

Methods, systems, and apparatus, including computer programs encoded on computer storage media, for frequency based audio analysis using neural networks. One of the methods includes training a neural network that includes a plurality of neural network layers on training data, wherein the neural network is configured to receive frequency domain features of an audio sample and to process the frequency domain features to generate a neural network output for the audio sample, wherein the neural network comprises (i) a convolutional layer that is configured to map frequency domain features to logarithmic scaled frequency domain features, wherein the convolutional layer comprises one or more convolutional layer filters, and (ii) one or more other neural network layers having respective layer parameters that are configured to process the logarithmic scaled frequency domain features to generate the neural network output.

18 Claims, 7 Drawing Sheets

(56) References Cited

U.S. PATENT DOCUMENTS

| | | | |
|---|---|---|---|
| 2017/0236531 A1* | 8/2017 | Koretzky | G06F 3/04847 381/17 |
| 2017/0243113 A1* | 8/2017 | Fukuda | G06N 3/0454 |
| 2017/0256033 A1* | 9/2017 | Tuzel | G06T 5/00 |

OTHER PUBLICATIONS

"Applying Convolutional Neural Networks Concepts to Hybrid NN-HMM Model for Speech Recognition," Ossama Abdel-Hamid, Abdel-rahman Mohamed, Hui Jiang, Gerald Penn, 978-1-4673-0046-9/12/$26.00 © 2012 IEEE (Year: 2012).*

"Deep Convolutional Neural Networks for Large-scale Speech Tasks," Tara N. Sainath, Brian Kingsbury, George Saona, Hagen Soltau, Abdel-rahman Mohamed, George Dahl, Bhuvana Ramabhadrana, 0893-6080/© 2014 Elsevier Ltd. All rights reserved. (Year : 2014).*

International Preliminary Report on Patentability issued in International Application No. PCT/US2017/031890, dated Jul. 31, 2018, 22 pages.

Abdel-Hamid et al., "Convolutional Neural Networks for Speech Recognition," Transactions on Audio, Speech, and Language Processing, 22(10):1-26, Oct. 2014.

Written Opinion issued in International Application No. PCT/US2017/031890, dated Apr. 13, 2018, 9 pages.

International Search Report and Written Opinion issued in International Application No. PCT/US2017/031890, dated Aug. 24, 2017, 16 pages.

Sainath et al. "Learning the Speech Front-End with Raw Waveform CLDNNs," Proceedings INTERSPEECH 2015, Germany, Sep. 6, 2015, 5 pages.

Espi et al. "Exploiting spectro-temporal locality in deep learning based acoustic event detection," Eurasip Journal on Audio, Speech, and Music Processing, 2015(1) Sep. 14, 2015, 12 pages.

* cited by examiner

FREQUENCY BASED AUDIO ANALYSIS USING NEURAL NETWORKS

BACKGROUND

This specification relates to processing inputs through the layers of a neural network to generate outputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in methods for training a neural network that includes a plurality of neural network layers on training data, wherein the neural network is configured to receive frequency domain features of an audio sample and to process the frequency domain features to generate a neural network output for the audio sample, wherein the neural network comprises (i) a convolutional layer that is configured to map frequency domain features to logarithmic scaled frequency domain features, wherein the convolutional layer comprises one or more convolutional layer filters, and (ii) one or more other neural network layers having respective layer parameters that are configured to process the logarithmic scaled frequency domain features to generate the neural network output, wherein the method includes the actions of: obtaining training data comprising, for each of a plurality of training audio samples, frequency domain features of the training audio sample and a known output for the training audio sample; and training the neural network on the training data to adjust the values of the parameters of the other neural network layers and to adjust the one or more convolutional layer filters to determine an optimal logarithmic convolutional mapping of frequency domain features to logarithmic-scaled frequency domain features.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the frequency domain features of the training audio sample reside in a frequency spectrum comprising one or more frequency bands.

In some cases training the neural network on the training data comprises, for the convolutional layer: receiving the frequency domain features of the training audio sample; determining a size of each of the one or more convolutional layer filters; upscaling the one or more frequency bands to match the determined size of the one or more convolutional layer filters; processing the one or more upscaled frequency bands using the convolutional layer to generate a convolutional layer output; receiving a back-propagated gradient for the frequency domain features from a neural network layer above the convolutional layer; computing the gradient of an error function for the neural network with respect to the one or more convolutional layer filters, wherein the error function is dependent on the one or more convolutional layer filters and the received back-propagated gradient; and updating the one or more convolutional layer filters using the computed gradient.

In some implementations determining a respective size of each of the one or more convolutional layer filters comprises: selecting a frequency band that corresponds to a highest section of the frequency spectrum; and determining the respective size of each of the one or more convolutional layer filters based on the selected frequency band.

In some cases determining a respective size of each of the one or more convolutional layer filters comprises determining a predetermined respective size of each of the one or more convolutional layer filters.

In some implementations upscaling the one or more frequency bands to match the determined size of the one or more convolutional layer filters comprises upscaling the one or more frequency bands using interpolation methods.

In some implementations the frequency domain features of the training audio sample comprise linear frequency domain features.

Another innovative aspect of the subject matter described in this specification can be embodied in methods for processing data input through each of a plurality of layers of a neural network, wherein the neural network is configured to receive frequency domain features of an audio sample and to process the frequency domain features to generate a neural network output for the audio sample, wherein the neural network comprises (i) a convolutional layer that is configured to map frequency domain features to logarithmic scaled frequency domain features, wherein the convolutional layer comprises one or more convolutional layer filters, and (ii) one or more other neural network layers having respective layer parameters that are configured to process the logarithmic scaled frequency domain features to generate the neural network output, and wherein the method includes the actions of: obtaining data input comprising frequency domain features of an audio sample; processing the frequency domain features using the convolutional layer to generate a convolutional layer output, wherein the convolutional layer output comprises logarithmic-scaled frequency domain features; and processing the generated convolutional layer output using the one or more other neural network layers to generate a neural network output.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations processing the frequency domain features using the convolutional layer to generate a convolutional layer output, wherein the convolutional layer output comprises logarithmic-scaled frequency domain features, comprises: receiving, at the convolutional layer, the frequency domain features, wherein the frequency domain features reside in a frequency spectrum comprising one or more frequency bands; for each frequency band, downscaling a size of a respective convolutional filter based on the frequency band; and processing the one or more frequency bands using the downscaled one or more convolutional filters to generate the convolutional layer output.

Another innovative aspect of the subject matter described in this specification can be embodied in neural network systems implemented by one or more computers, the neural network systems comprising a plurality of neural network layers, wherein the neural network systems are configured to obtain a spectrogram of an audio sample and to process the spectrogram to generate a neural network output for the audio sample, the plurality of neural network layers comprising: a first subnetwork comprising a sequence of a plurality of convolutional neural network stages configured to perform a convolutional mapping of frequency domain features to multi-scale frequency domain features, wherein each convolutional neural network stage in the sequence of convolutional neural network stages comprises one or more convolutional neural network layers each having respective convolutional layer parameters, wherein (i) a first convolutional neural network stage in the sequence of convolutional neural network stages is configured to obtain the spectrogram of the audio sample and generate a first convolutional output, and (ii) each subsequent convolutional neural network stage in the sequence of convolutional neural network stages is configured to receive a convolutional output generated by a preceding convolutional neural network stage in the sequence of convolutional neural network stages and generate a respective convolutional neural network output; a second subnetwork comprising at least (i) a hidden neural network layer and (ii) an output layer, each having respective layer parameters, wherein (i) the hidden neural network layer is configured to receive one or more of the convolutional neural network outputs generated by the convolutional neural network layers in the sequence of convolutional neural network layers and generate a hidden neural network layer output, (ii) the output layer is configured to receive the hidden neural network output and generate the neural network output for the audio sample.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the first convolutional neural network stage is configured to: receive the spectrogram of the audio sample, wherein the spectrogram comprises a plurality of rows corresponding to frequency bands and a plurality columns corresponding to time bands; compress a time band of height H by length L to one or more vectors of size H by one; and provide the one or more vectors of size H by one to a subsequent convolutional neural network stage in the sequence of convolutional neural network stages for processing.

In some cases each subsequent convolutional neural network stage is configured to: receive one or more vector inputs from a preceding convolutional neural network stage; reduce the size received one or more vector inputs by a factor of two to generate a respective convolutional neural network stage output; and provide the respective convolutional neural network stage output to a subsequent neural network layer for processing.

In some implementations convolutional layer parameters included in the subsequent convolutional neural network stages comprise convolutional layer filters of height 3 and row stride 2.

In some cases each subsequent convolutional neural network stage comprises at least (i) a 1×1×2 convolutional layer with row stride of 1 followed by a max pooling layer with row stride 2, (ii) a 3×1×D convolutional layer, and (iii) a 3×1×D depthwise-separable convolution with row stride 1 followed by a max pooling layer with row stride 2, wherein D represents a convolutional layer filter depth.

In some implementations each sub subsequent convolutional neural network stage comprises rectified linear units.

In some cases the hidden neural network layer is configured to receive a row concatenation of each generated convolutional stage output.

In some cases the hidden neural network layer is configured to receive an output corresponding to a final convolutional in the sequence of convolutional neural network stages.

In some cases the depth of each convolutional neural network layer in the sequence of convolutional neural network stages increases through the sequence of convolutional neural network stages.

In some implementations the depth of each convolutional neural network layer in the sequence of convolutional neural network stages is greater than one.

In some cases the neural network system is trained on training data to adjust the values of the layer parameters of the other neural network layers and to adjust the one or more respective convolutional layer parameters to determine an optimal convolutional mapping of frequency domain features to multi-scale frequency domain features, wherein training comprises: obtaining training data comprising, for each of a plurality of training audio samples, a spectrogram of the training audio sample and a known output for the training audio sample; and training the neural network on the training data to adjust the values of the parameters of the layers of the second subnetwork and to adjust the one or more convolutional layer parameters to determine the optimal convolutional mapping of frequency domain features to multi-scale frequency domain features, wherein training comprises, for each convolutional layer in the first subnetwork: receiving a respective convolutional layer input; processing the received convolutional layer input through the convolutional layer to generate a convolutional layer output; receiving a back-propagated gradient for the spectrogram from a neural network layer above the convolutional layer; computing the gradient of an error function for the neural network, wherein the error function is dependent on the respective convolutional layer parameters and the received back-propagated gradient; and updating the respective convolutional layer parameters using the computed gradient.

The subject matter described in this specification can be implemented in particular embodiments so as to realize one or more of the following advantages.

Audio processing tasks such as speech recognition, content identification, music recognition, emergency siren detection and other classification problems typically work with frequency domain features as input. For example, human hearing may be expressed on a logarithmic scale, and as a result, some audio processing systems attempt to emulate this by mapping received frequency domain features, e.g., linear scale frequency domain features to logarithmic or near-logarithmic scale frequency domain features, e.g., on the mel frequency scale and/or using Mel-frequency cepstral coefficients. The mapped frequency domain features may then be provided as input to an audio classification system, e.g., a neural network, to train classifiers for a given classification or recognition task.

However, important information may be lost during the mapping process and a hardcoded fixed-scale mapping may not provide an optimal mapping of frequency domain features for a given task. Therefore, the accuracy and performance of an audio classification system receiving the mapped frequency domain features may be reduced.

A logarithmic scale convolutional neural network system as described in this specification learns logarithmic scale convolutions on frequency domain features, e.g., linear frequency domain features, that may be applied uniformly across a whole frequency spectrum for a given classification task. In particular, a logarithmic scale convolutional neural network system as described in this specification learns different logarithmic scale convolutions for different classification tasks and different input signal characteristics. A neural network system implementing logarithmic scale convolutions as described in this specification may therefore achieve higher levels of accuracy, e.g., higher quality feature extraction, when classifying raw input samples compared to systems that apply a fixed scale frequency mapping prior to processing the frequency features using a neural network system.

A cascaded convolutional neural network system as described in this specification learns variable sized convolutions on frequency domain features, e.g., linear frequency domain features. In particular, a cascaded convolutional neural network system as described in this specification produces variable sized convolutional windows, where all resolutions may be produced in a concatenated output from a convolutional cascade. Layers that follow the convolutional cascade can select scales that are most useful for different parts of a frequency spectrum. Therefore, a cascaded convolutional neural network system as described in this specification may achieve improved accuracy and more reliable feature extraction over other neural network systems since the system does not require that a hard choice be made about particular resolution for a given task.

In addition, a cascaded convolutional neural network system as described in this specification may be able to achieve higher levels of computational efficiency whilst requiring a reduced amount of computational resources compared to other neural network systems due to the particular architecture of the neural network system. For example, a cascaded convolutional neural network system as described in this specification may be implemented on a resource constrained device, e.g., on a mobile device.

Furthermore, a cascaded convolutional neural network system as described in this specification may require a low footprint in memory and on disk.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods for learning variable size convolutions on a linear spectrogram. In some aspects, a model is trained to learn a single logarithmic convolutional mapping that is applied uniformly across the whole frequency spectrum. In other aspects, a model uses a cascade of convolutions to create features aggregated across different resolutions in logarithmic progression. The convolutions of different scales are concatenated into a single feature, convolved across time and provided to one or more neural network layers, e.g., for classification or regression purposes.

Figure 1:
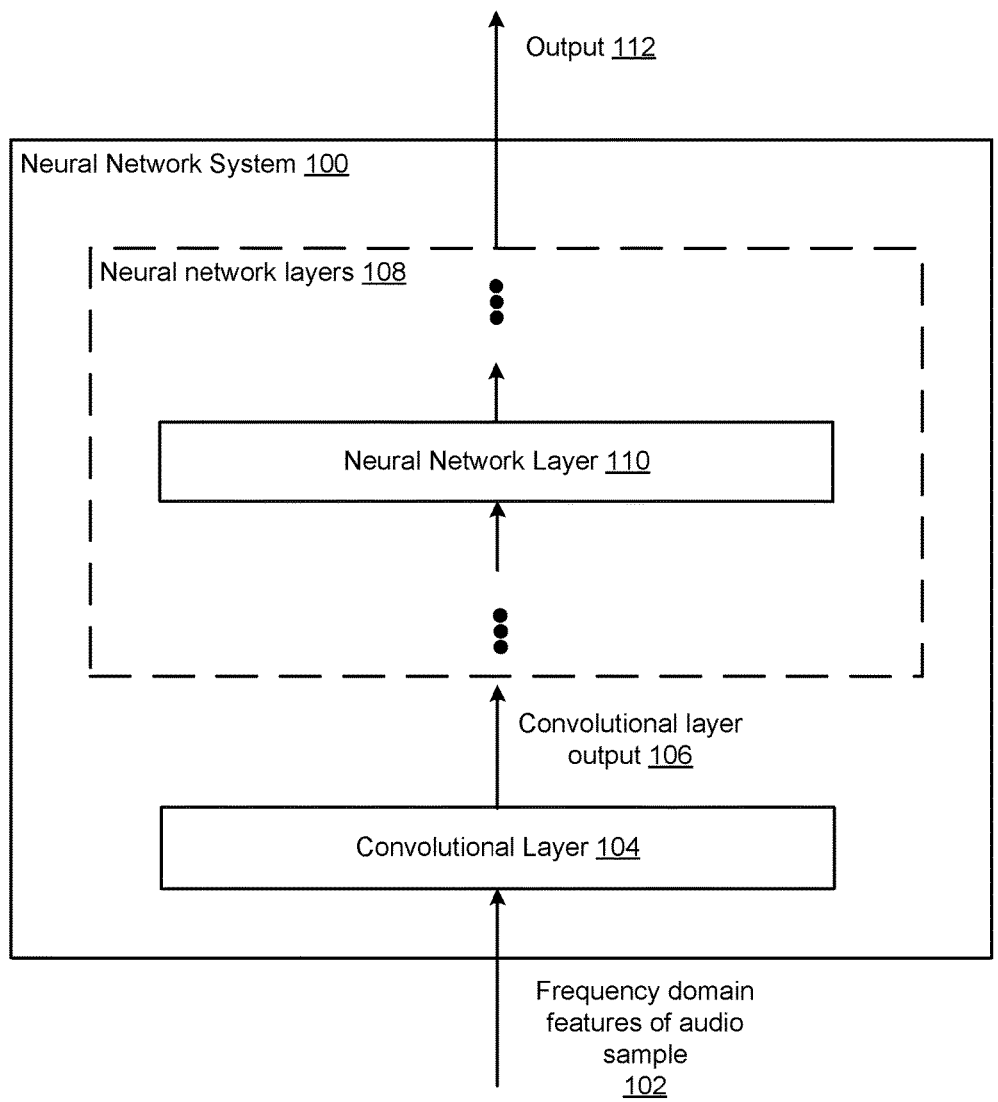
FIG. 1 is an example of a logarithmic scale convolutional neural network system.

FIG. 1 shows an example logarithmic scale convolutional neural network system 100. The logarithmic scale convolutional neural network system 100 is an example of a system implemented as computer programs on one or more computers in one or more locations, in which the systems, components, and techniques described below can be implemented.

The logarithmic scale convolutional neural network system 100 is a machine learning system that receives system inputs and generates system outputs from the system inputs. The neural network system 100 can be configured to receive frequency domain features of an audio sample 102 and to generate a respective output 112 based on the input.

In some implementations the respective output may include a respective score or audio sample classification. For example, if the input to the neural network system 100 includes one or more of frequency domain features of an audio sample representing an utterance, the output generated by the neural network system 100 may be a score for each of a set of pieces of text, each score representing an estimated likelihood that the piece of text is the correct transcript for the utterance or sequence of utterances. In some example, the neural network system 100 can be part of a content identification system and the output generated by the neural network system 100 may be a score for each of a set piece of content or each segment in each set piece of content. As another example, the neural network system 100 can be part of an emergency siren detection system and the output generated by the neural network system 100 may be a score that classifies an input as a siren or not.

In other implementations the respective output may be used to predict a single value or multiple values (e.g., regression). For example, the neural network system output 112 may estimate the level of a certain type of noise, e.g., speech, in an audio sample input to the system. As another example, the neural network system output 112 may include a prediction of a year in which a song represented by the audio sample was recorded. As a further example, the neural network system may be used to generate audio, e.g., echo cancellation. For example, the audio sample input 102 may include two sub inputs, e.g., a mixed signal and a background signal, and the respective neural network system output 112 may include an audio sample that is generated by subtracting a background signal from a mixed signal.

The frequency domain features of an audio sample 102 may include linear scale frequency domain features of the audio sample. The frequency domain features reside in a frequency spectrum including one or more frequency bands, e.g., an interval in the frequency domain delimited by a lower frequency and an upper frequency.

The logarithmic scale convolutional neural network system 100 includes multiple neural network layers, e.g., convolutional layer 104 and neural network layers 108. Each of the neural network layers in the logarithmic scale convolutional neural network system 100 is configured to receive a respective layer input and process the layer input to generate a respective layer output from the input. The neural network layers collectively process neural network inputs received by the neural network system 100 to generate a respective neural network output for each received neural network input. Generating a logarithmic scale convolutional neural network system output from an input is described in more detail below with reference to FIG. 3.

Some or all of the layers of the neural network system 100 are associated with a respective set of parameters. The neural network layers generate outputs from inputs in accordance with the current values of the parameters for the neural network layer. For example, some layers may multiply the received input by a respective parameter matrix of current parameter values as part of generating an output from the received input.

At least one of the neural network layers in the logarithmic scale convolutional neural network system 100 is a convolutional layer, e.g., convolutional layer 104. Although only one convolutional layer is depicted in FIG. 1 for convenience, the neural network system 100 may include multiple convolutional neural network layers.

A convolutional neural network layer is a neural network layer whose neurons, or nodes, are logically arranged in a three dimensional array: width, height and depth. Neurons inside a convolutional neural network layer are connected to a small region of the layer preceding the convolutional neural network layer, called a receptive field, and each neuron inside a convolutional neural network layer detects the same feature, constituting the property of translation invariance. Typically a local connectivity pattern between neurons of adjacent layers is enforced. Example convolutional neural network layers are described in more detail in "Convolutional Neural Networks for Speech Recognition" Ossama Abdel-Hamid, Abdel-rahman Mohamed, Hui Jiang, Li Deng, Gerald Penn, and Dong Yu, *IEEE/ACM TRANSACTIONS ON AUDIO, SPEECH, AND LANGUAGE PROCESSING*, VOL. 22, NO. 10, October 2014.

The associated set of layer parameters for a convolutional neural network layer includes a respective set of learnable convolutional layer filters. Each convolutional layer filter in the set of convolutional layer filters has a small receptive field and extends through the full depth of the respective convolutional neural network layer. For example, filters may be described using the notation <filter_height>×<filter_width>×<depth>. Hyperparameters of the convolutional neural network layer, e.g., depth, stride and padding, control the size of the output of the convolutional neural network layer and are variable. The size of the set of convolutional layer filters, e.g., <filter_height>×<filter_width>, may include a fixed base size, however may also be varied according to the task to be performed by the neural network system.

Convolutional layer 104 is a convolutional neural network layer that is configured to map received frequency domain feature inputs, e.g., linear scale frequency domain feature inputs, to logarithmic scaled frequency domain outputs. The convolutional layer 104 maps received frequency domain feature inputs to logarithmic scaled frequency domain outputs by adjusting the size of the respective set of convolutional layer filters for the layer 104. Adjusting the size of the respective set of convolutional layer filters to map frequency domain feature inputs to logarithmic scaled frequency domain inputs is described in more detail below with reference to FIG. 3.

Neural network layers 108 include one or more other neural network layers, e.g., neural network layer 110. Although only one neural network layer 110 is depicted in FIG. 1 for convenience, the neural network system 100 may include multiple neural network layers. The number of neural network layers 108 included in the neural network system 100 is dependent on the task that the neural network system 100 is configured to perform. Furthermore, the type of the neural network layers 108 included in the neural network system 100 is dependent on the task that the neural network system is configured to perform. For example, in some implementations the one or more other neural network layers may include one or more fully connected neural network layers. In other implementations the one or more neural networks may include recurrent neural network layers, e.g., Long Short-Term Memory (LSTM) layers. In these implementations, the neural network system 100 may receive as input a sequence of input frequency domain features of an audio sample corresponding to a set of time steps. The convolutional layer 104 may process each input in the received sequence of input frequency domain features to generate a respective sequence of mapped logarithmic frequency domain features as output, which in turn may be provided to the neural network layers 108.

The logarithmic scale convolutional neural network system 100 can be trained on multiple training audio samples in order to determine trained values of the parameters of the neural network layers, i.e., to adjust the values of the parameters from initial values to trained values. For example, during the training, the logarithmic scale convolutional neural network system 100 can process features of each of multiple training audio samples and generate a respective neural network output for each training audio sample. The neural network outputs can then be used to adjust the values of the parameters of the logarithmic scale convolutional neural network system 100, e.g., to adjust the one or more convolutional layer filters. In some implementations the logarithmic scale convolutional neural network system 100 adjusts the values of the parameters using gradient descent and back-propagation neural network training techniques. Training a logarithmic scale convolutional neural network system 100 is described in more detail below with reference to FIGS. 5 and 6.

Once the logarithmic scale convolutional neural network system 100 has been trained, the neural network system may receive a new neural network input for processing and process the neural network input through the neural network layers to generate a new neural network output for the input in accordance with the trained values of the parameters of the logarithmic scale convolutional neural network system 100.

Figure 2:
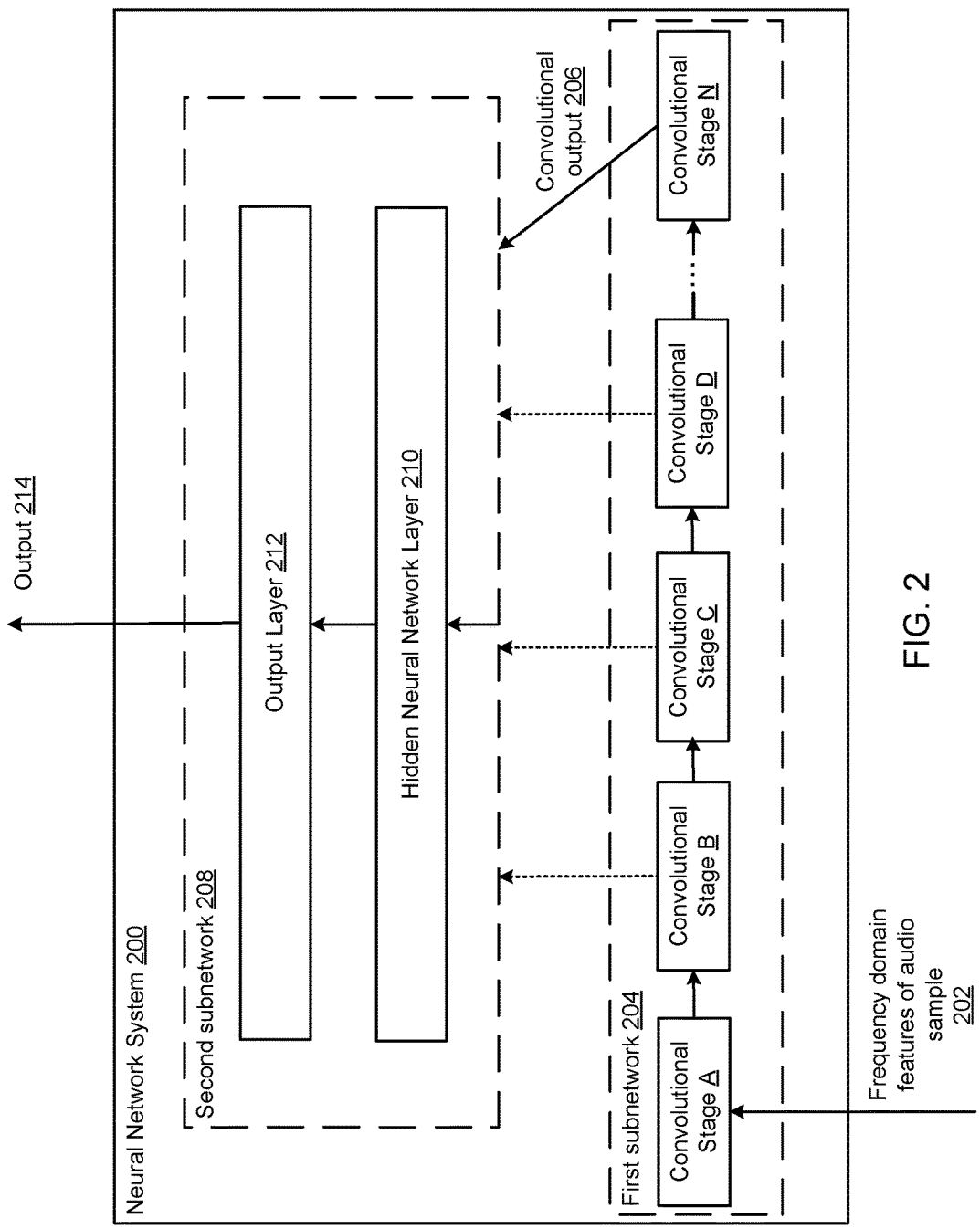
FIG. 2 is an example of a cascaded convolutional neural network system.

FIG. 2 shows an example cascaded convolutional neural network system 200. The cascaded convolutional neural network system 200 is an example of a system implemented as computer programs on one or more computers in one or more locations, in which the systems, components, and techniques described below can be implemented.

The cascaded convolutional neural network system 200 is a machine learning system that receives system inputs and generates system outputs from the system inputs. The neural network system 200 can be configured to receive frequency domain features of an audio sample 202 and to generate a respective output 214 based on the input.

In some implementations the respective output may include a respective score or audio sample classification. For example, if the input to the neural network system 200 includes one or more frequency domain features of an audio sample representing an utterance the output generated by the neural network system 200 may be a score for each of a set of pieces of text, each score representing an estimated likelihood that the piece of text is the correct transcript for the utterance or sequence of utterances. In some examples, the neural network system 200 can be part of a content identification system and the output generated by the neural network system 200 may be a score for each of a set piece of content or each segment in each set piece of content. As another example, the neural network system 200 can be part of an emergency siren detection system and the output generated by the neural network system 200 may be a score that classifies an input as a siren or not.

In other implementations the respective output may be used to predict a single value or multiple values (e.g., regression). For example, the neural network system output 214 may estimate the level of a certain type of noise, e.g., speech, in an audio sample input to the system. As another example, the neural network system output 214 may include a prediction of a year in which a song represented by the audio sample was recorded. As a further example, the neural network system may be used to generate audio, e.g., echo cancellation. For example, the audio sample input 202 may include two sub inputs, e.g., a mixed signal and a background signal, and the respective neural network system output 214 may include an audio sample that is generated by subtracting a background signal from a mixed signal.

The frequency domain features of the audio sample 202 may include linear scale frequency domain features of the audio sample. The frequency domain features may be represented by a spectrogram, e.g., a two dimensional array with a horizontal axis representing time, a vertical axis representing frequency and a third dimension indicating an amplitude at a particular frequency and time, e.g., represented by the intensity of a color. The spectrogram may be generated using a DFT, FFT or other frequency transform. In cases where the spectrogram is generated using a Fourier transform, the magnitude or log-magnitude of complex numbers may be taken to produce a spectrogram of real numbers.

The cascaded convolutional neural network system 200 includes multiple neural network layers, e.g., one or more convolutional layers included in each of convolutional stages A-N (as described below), hidden neural network layer 210 and output layer 212. Each of the neural network layers in the cascaded convolutional neural network system 200 is configured to receive a respective layer input and process the layer input to generate a respective layer output from the input. The neural network layers collectively process neural network inputs received by the neural network system 200 to generate a respective neural network output for each received neural network input. Generating a cascaded convolutional neural network system output from an input is described in more detail below with reference to FIG. 4.

Some or all of the layers of the neural network system 200 are associated with a respective set of parameters. The neural network layers generate outputs from inputs in accordance with the current values of the parameters for the neural network layer. For example, some layers may multiply the received input by a respective parameter matrix of current parameter values as part of generating an output from the received input.

The cascaded convolutional neural network system 200 includes a first subnetwork 204 that includes a sequence of one or more convolutional neural network stages, e.g., convolutional stages A-N. Each convolutional neural network stage in the sequence of convolutional neural network stages includes a convolutional layer and, optionally, one or more other neural network layers. Convolutional neural network layers are described in detail above with respect to FIG. 1. Although five convolutional stages are depicted in FIG. 2 for convenience, the neural network system 200 may include more or less convolutional stages.

A first convolutional neural network stage in the sequence of convolutional neural network stages, e.g., convolutional neural network stage A, is configured to receive the frequency domain features of the audio sample 202 and generate a respective first convolutional stage output that may be provided to a subsequent convolutional neural network stage, e.g., convolutional neural network stage B.

In some implementations the first convolutional neural network stage captures frequency and time properties of the received frequency domain features 202 across narrow frequency bands, e.g., three rows of the corresponding spectrogram, and a specified time band of length L and step of H spectrogram columns. The first convolutional neural network stage A may compress a time band of size H×L to a vector of size H×1, or in some implementations to $D_0+1$ vectors of size H×1, where $D_0$ represents a depth of a bottom convolutional neural network layer included in convolutional neural network stage A. In some implementations the depth of each convolutional neural network stage in the sequence of convolutional neural network stages A-N increases through the sequence. In some cases the depth of each convolutional neural network stage in the sequence of convolutional neural network stages is greater than one.

In some implementations the first convolutional neural network stage A may be used to perform filtering of the spectrogram in either time, frequency or both time and frequency prior to computing the cascade. The first convolutional neural network stage A may include a step of one. In some cases the first convolutional neural network stage A allows for smoothing to be applied to the spectrogram.

The subsequent convolutional neural network stages B-N in the sequence of convolutional neural network stages A-N are configured to receive a respective convolutional output generated by a preceding convolutional neural network stage in the sequence of convolutional neural network stages and generate a respective convolutional neural network output that may be provided to a subsequent convolutional neural network stage, to the second subnetwork 208, or both, e.g., convolutional stage C receives as input a respective convolutional output generated by convolutional stage B and generates a respective convolutional neural network output that is provided to convolutional stage D. The generated respective convolutional outputs may also be provided to the second subnetwork 208, e.g., to hidden neural network layer 210, as indicated by the dashed arrows in FIG. 2.

In some implementations each subsequent convolutional neural network stage reduces a height of the received respective convolutional output generated by a preceding convolutional neural network stage by a factor of two. For example, the sequence of convolutions may use convolutional filters of height three and row stride two to allow for the filters to overlap in order to achieve some smearing between neighboring applications of the filter.

In some implementations each of the subsequent convolutional neural network stages B-N may be composed of at least (i) a 1×1×2 convolutional layer with row stride of 1 followed by a max pooling layer with row stride 2, (ii) a 3×1×D convolutional layer, and (iii) a 3×1×D depthwise-separable convolution with row stride 1 followed by a max pooling layer with row stride 2, wherein D represents a convolutional layer filter depth. In some cases each of the subsequent convolutional neural network stages B-N include rectified linear units.

The cascaded convolutional neural network system 200 includes a second subnetwork 208 that includes at least one hidden neural network layer, e.g., hidden neural network layer 210, and an output layer 212. Although two layers are depicted in the second subnetwork 208 of FIG. 2 for convenience, the neural network system 200 may include a second subnetwork with more or less layers.

Hidden neural network layer 210 is configured to receive generated convolutional stage outputs from first subnetwork 204. In some implementations hidden neural network layer 210 may be configured to receive a row concatenation of each generated convolutional stage output, as indicated by the dashed arrows in FIG. 2. In other implementations hidden neural network layer 210 may be configured to receive an output corresponding to a final convolutional in the sequence of convolutional neural network stages, as indicated by the solid arrow leading from convolutional stage N to second subnetwork 208. In some implementations the output of the convolutional layers can be concatenated and processed by the hidden neural network layer 210, allowing for the hidden neural network layer 210 to learn weighting s for different scales of frequency ranges.

Hidden neural network layer 210 may be configured to process the received convolutional stage outputs to generate a hidden neural network output that is provided to the second subnetwork output layer 212. In some implementations the hidden neural network layer 210 includes one or more layer parameters that define a weighting of the received convolutional neural network outputs from the first subnetwork 204. The output layer 212 processes the hidden neural network output to generate a neural network output 214.

The cascaded convolutional neural network system 200 can be trained on multiple training audio samples in order to determine trained values of the parameters of the neural network layers, i.e., to adjust the values of the parameters from initial values to trained values. For example, during the training, the cascaded convolutional neural network system 200 can process features of each of multiple training audio samples and generate a respective neural network output for each training audio sample. The neural network outputs can then be used to adjust the values of the parameters of the cascaded convolutional neural network system 200. In some implementations the cascaded convolutional neural network system 200 adjusts the values of the parameters using gradient descent and back-propagation neural network training techniques. Training a cascaded convolutional neural network system 200 is described in more detail below with reference to FIG. 7.

Once the cascaded convolutional neural network system 200 has been trained, the neural network system may receive a new neural network input for processing and process the neural network input through the neural network layers to generate a new neural network output for the input in accordance with the trained values of the parameters of the cascaded convolutional neural network system 200.

Figure 3:
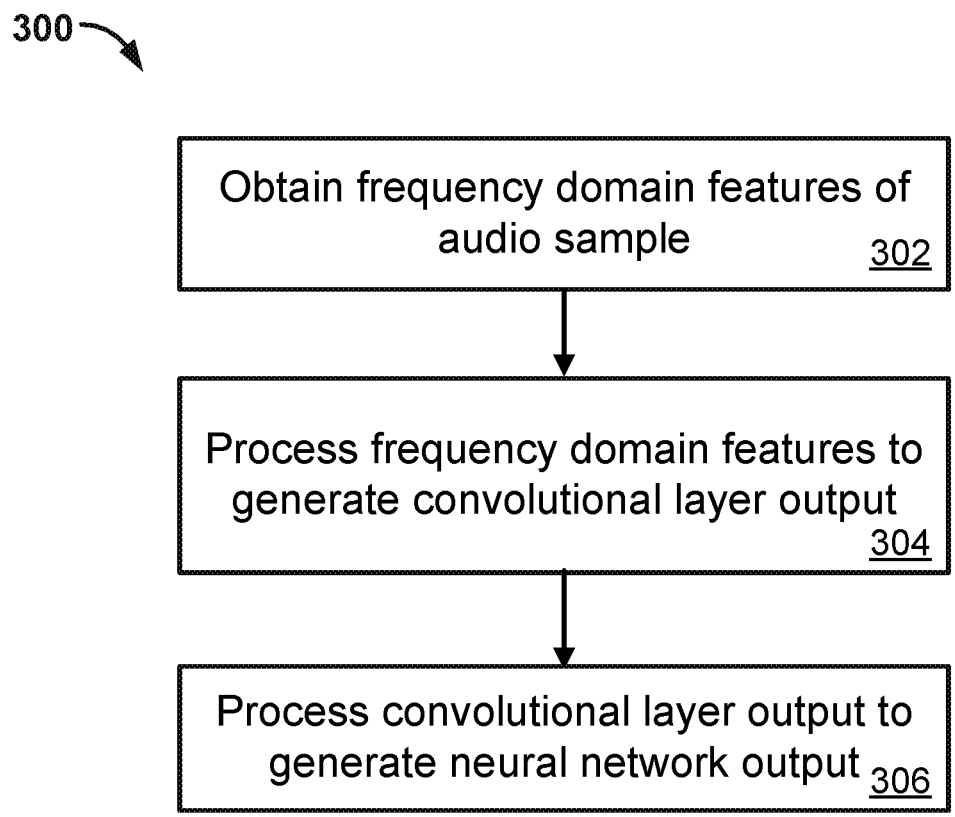
FIG. 3 is a flow diagram of an example process for generating a logarithmic scale convolutional neural network system output from an input.

FIG. 3 is a flow diagram of an example process 300 for generating a logarithmic scale convolutional neural network system output from an input. For convenience, the process 300 will be described as being performed by a system of one or more computers located in one or more locations. For example, a neural network system configured to map frequency domain features to logarithmic scale frequency domain features, e.g., the logarithmic scale convolutional neural network system 100 with convolutional layer 104 of FIG. 1 trained in accordance with FIGS. 5 and 6 below, appropriately programmed in accordance with this specification, can perform the process 300.

The system obtains data input including frequency domain features of an audio sample (step 302). The frequency domain features reside in a frequency spectrum including one or more frequency bands. For example, the frequency domain features may be the result of applying a discrete Fourier transform to time domain features of the audio sample. In other examples the frequency domain features may be the result of applying a fast Fourier transform, filter banks or Mel-frequency cepstral to time domain features of the audio sample. In some implementations the frequency domain features of the audio sample may include linear scale frequency domain features, e.g., in cases where a fast Fourier transform was used to transform time domain features of the audio sample to frequency domain features.

The system processes the frequency domain features using the convolutional layer, e.g., convolutional layer 104, to generate a convolutional layer output (step 304). The generated convolutional layer output includes logarithmic scaled frequency domain features. In some implementations the system processes the frequency domain features using the convolutional layer by receiving the frequency domain features at the convolutional layer and, for each frequency band included in the frequency spectrum in which the frequency domain features reside, downscaling a size of a respective convolutional filter included in the convolutional layer based on the frequency band. The system may then process the one or more frequency bands using the downscaled one or more convolutional filters to generate the convolutional layer output.

The system processes the generated convolutional layer output using one or more other neural network layers to generate a neural network output (step 306). For example, the system may process the generated convolutional layer output using one or more other neural network layers, e.g., neural network layers 108 of FIG. 1, to generate the neural network output. The generated neural network output may include a classification of the audio sample described above with reference to step 302. For example, if the audio sample represents an utterance, or sequence of utterances, the generated neural network output may include a score for each of a set of pieces of text, each score representing an estimated likelihood that the piece of text is the correct transcript for the utterance or sequence of utterances. In some cases the generated neural network output may be used to predict a single value or multiple values (e.g., regression).

Figure 4:
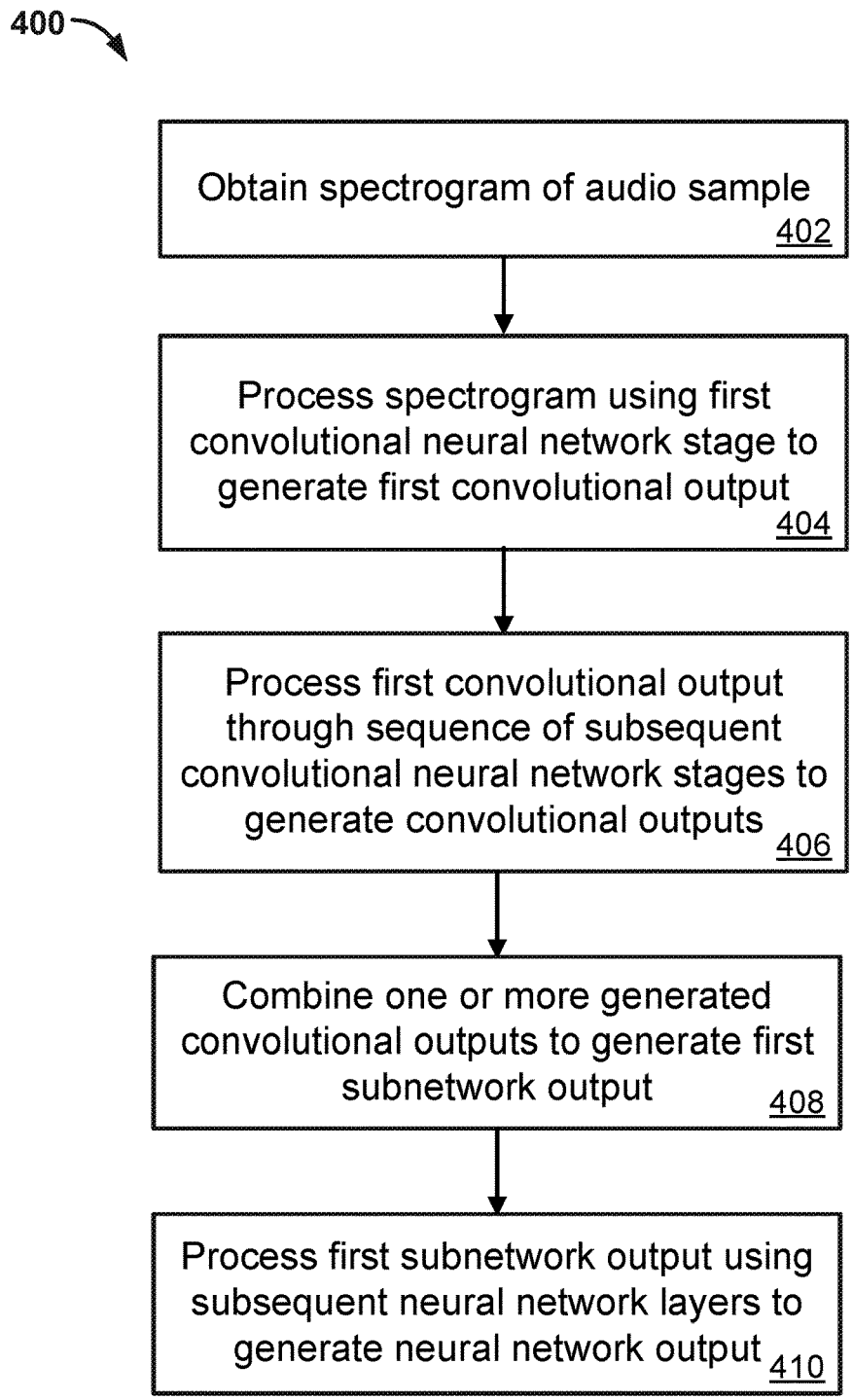
FIG. 4 is a flow diagram of an example process for generating a cascaded convolutional neural network system output from an input.

FIG. 4 is a flow diagram of an example process 400 for generating a cascaded convolutional neural network system output from an input. For convenience, the process 400 will be described as being performed by a system of one or more computers located in one or more locations. For example, a neural network system configured to map frequency domain features to variable scale frequency domain features, e.g., the cascaded convolutional neural network system 200 of FIG. 2, appropriately programmed in accordance with this specification, can perform the process 400.

The system obtains a spectrogram of an audio sample (step 402). In some implementations the spectrogram may be represented by a two dimensional array including one or more rows representing frequency bands and one or more columns representing time bands. The frequency domain features included in the spectrogram may include linear scale frequency domain features.

The system processes the spectrogram using a first convolutional neural network stage of a sequence of convolutional neural network stage to generate a first convolutional output (step 404). As described above with respect to step 402, in some implementations the spectrogram may be represented by a two dimensional array including one or more rows representing frequency bands and one or more columns representing time bands. In such cases, processing the spectrogram using a first convolutional neural network stage may include compressing a time band of H×L, where H represents height and L length, to one or more vectors of size H×1 and providing the one or more vectors of size H×1 to a subsequent convolutional neural network stage in the sequence of convolutional neural network stages for processing.

The system processes the first convolutional output through the subsequent convolutional neural network stages in the sequence to generate respective convolutional neural network stage outputs (step 406). In some implementations, for each subsequent convolutional neural network stage, the system may receive one or more vector inputs from a preceding convolutional neural network stage, reduce the size of the received one or more vector inputs by a factor of two to generate a respective convolutional neural network stage output and provide the respective convolutional neural network stage output to a subsequent neural network stage for processing. For example, for a convolutional neural network stage that follows the first convolutional neural network stage in the sequence of convolutional neural network stages, the system may receive one or more vectors of size H×1 and reduce the size of the one or more vectors to generate a respective convolutional network stage output including one or more vectors of size H/2×1. The generated respective convolutional neural network stage outputs include a cascade of convolutions that create audio sample features aggregated across different resolutions, e.g., in a logarithmic progression.

The system combines one or more generated convolutional neural network stage outputs to generate a first subnetwork output (step 408). In some implementations the first subnetwork output includes a row concatenation of each of the generated convolutional stage output, e.g., as indicated by each of the dotted arrows leaving convolutional stages A-C together with the final solid arrow leaving convolutional stage N in FIG. 2. In other implementations the first subnetwork output includes a single output corresponding to a final convolutional output in the sequence of convolutional neural network stages, e.g., the solid arrow leaving convolutional stage N in FIG. 2. In further implementations the first subnetwork output includes a combination of one or more of the generated convolutional stage outputs.

The system processes the first subnetwork layer output through a sequence of other neural network layers to generate a neural network output (step 410). The generated neural network output may classify the audio sample described above with reference to step 402. For example, if the spectrogram of the audio sample represents an utterance, the output generated by the neural network system 200 may be a score for each of a set of pieces of text, each score representing an estimated likelihood that the piece of text is the correct transcript for the utterance or sequence of utterances. In other examples the neural network output may be used to predict a single value or multiple values (e.g., regression).

Figure 5:
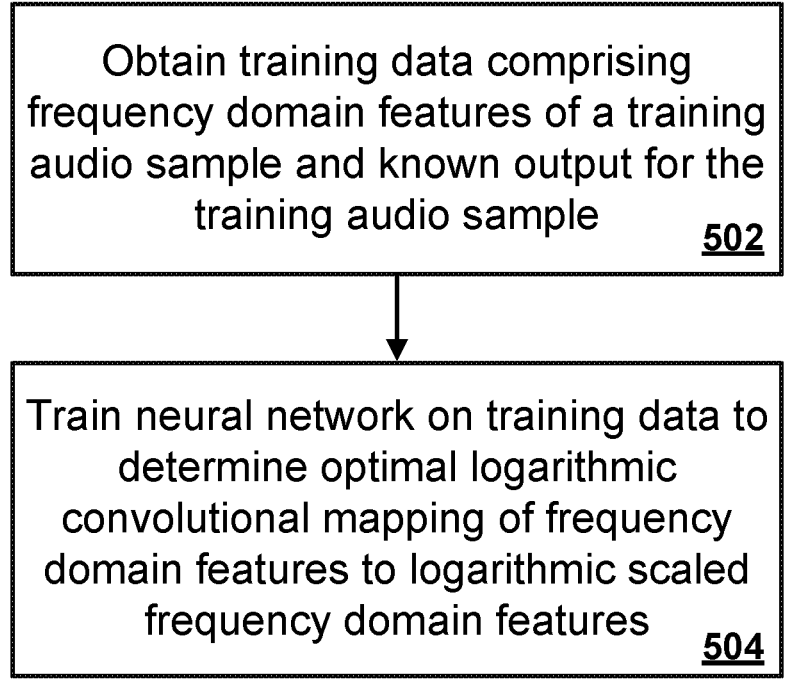
FIG. 5 is a flow diagram of an example process for training a convolutional neural network layer and one or more other neural network layers.

FIG. 5 is a flow diagram of an example process 500 for training a convolutional neural network layer and one or more other neural network layers. For convenience, the process 500 will be described as being performed by a system of one or more computers located in one or more locations. For example, a logarithmic scale convolutional neural network, e.g., the logarithmic scale convolutional neural network system 100 of FIG. 1, appropriately programmed in accordance with this specification, can perform the process 500.

The system obtains training data including, for each of a set of training audio samples, frequency domain features of the training audio sample and a known output for the training audio sample (step 502). In some implementations the training data may include time domain features of a training audio sample and a known classification for the training audio sample. The frequency domain features reside in a frequency spectrum including one or more frequency bands. For example, the frequency domain features may be the result of applying a discrete Fourier transform to time domain features of the audio sample. In other examples the frequency domain features may be the result of applying a fast Fourier transform, filter banks or Mel-frequency cepstral to time domain features of the audio sample. In some implementations the frequency domain features of the audio sample may include linear scale frequency domain features, e.g., in cases where a fast Fourier transform was used to transform time domain features of the audio sample to frequency domain features.

The system trains the neural network on the training data to adjust the values of the parameters of the other neural network layers and to adjust the one or more convolutional layer filters to determine a set of trained parameters (step 504). The system trains the neural network by processing the training data as input to the neural network to generate a training data neural network output, as described above with reference to FIG. 3. Training a convolutional layer of a logarithmic scale convolutional neural network system on a training audio sample to adjust the one or more convolutional layer filters to determine a set of trained parameters is described in more detail below with reference to FIG. 6.

The set of trained parameters define an optimal logarithmic convolutional mapping of frequency domain features to logarithmic scaled frequency domain features.

Figure 6:
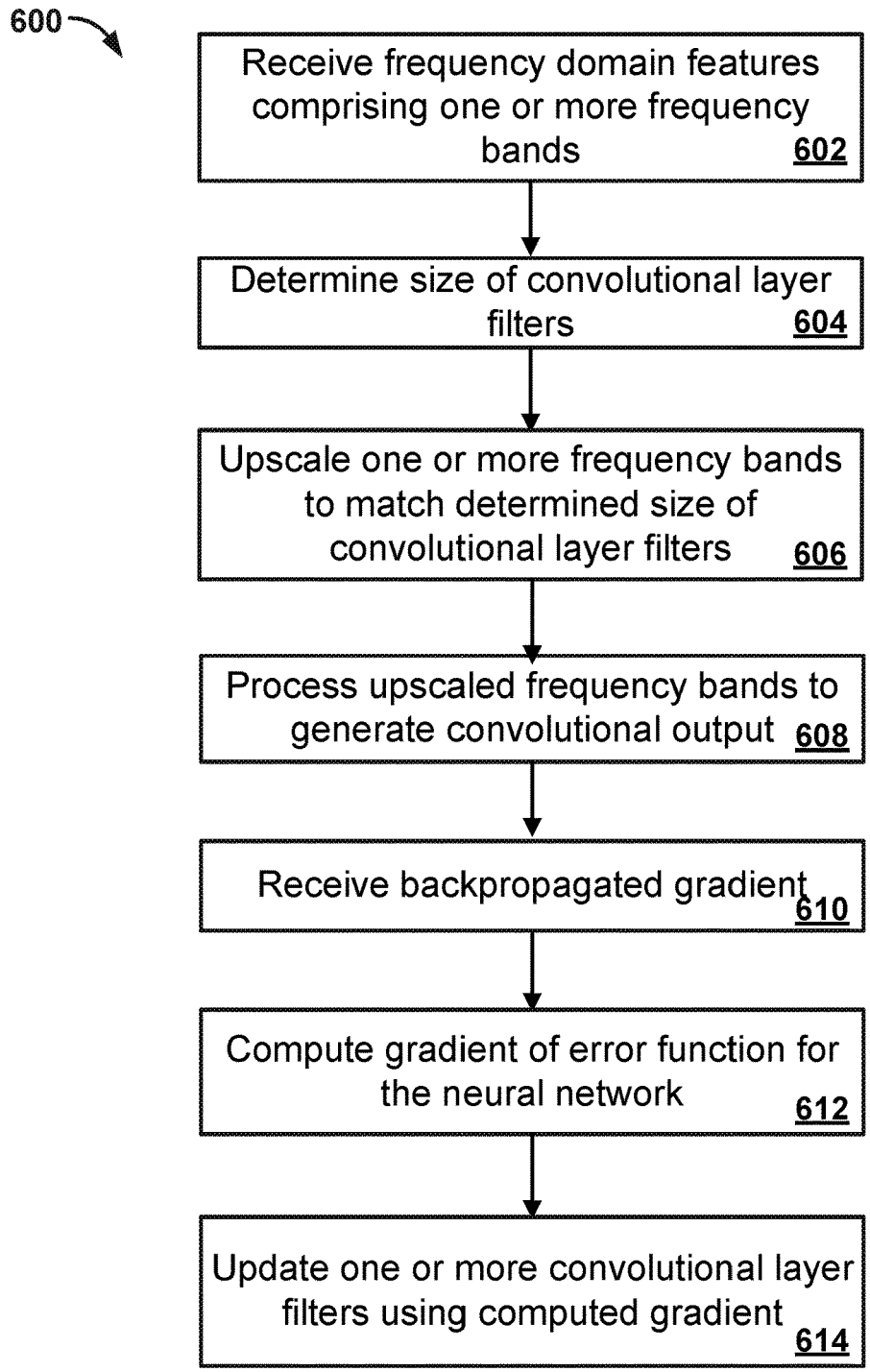
FIG. 6 is a flow diagram of an example process for training a convolutional layer of a logarithmic scale convolutional neural network system on a training audio sample.

FIG. 6 is a flow diagram of an example process 600 for training a convolutional layer of a logarithmic scale convolutional neural network system on a training audio sample. For convenience, the process 600 will be described as being performed by a system of one or more computers located in one or more locations. For example, a logarithmic scale convolutional neural network, e.g., the logarithmic scale convolutional neural network system 100 of FIG. 1, appropriately programmed in accordance with this specification, can perform the process 600.

The system receives frequency domain features of the training audio sample as input to the convolutional neural network layer (step 602). As described above with reference to FIG. 5, the frequency domain features of the training audio sample reside in a frequency spectrum including one or more frequency bands.

The system determines a size of each of the one or more convolutional layer filters (step 604). In some implementations the system determines a respective size of each of the one or more convolutional layer filters by selecting a frequency band that corresponds to a highest section of the frequency spectrum and determining the respective size of each of the one or more convolutional layer filters based on the selected frequency band. In some cases the system determines a respective size of each of the one or more convolutional layer filters by determining a predetermined respective size of each of the one or more convolutional layer filters.

The system upscales the one or more frequency bands to match the determined size of the one or more convolutional layer filters (step 606). In some implementations the system upscales the one or more frequency bands to match the determined size of the one or more convolutional layer filters using interpolation methods, such as linear, quadratic or spline interpolation methods. For example, a frequency window may slide over a spectrogram representing the frequency domain features, where the window has variable height which is determined based on an upper, mid or lower frequency of where the window is placed in the spectrogram. Since the convolutional filter has enough parameters to capture the full resolution of the spectrogram at the highest frequency band, at all other frequencies the window of the spectrogram is upscaled to match the size of the convolutional filter. For example, at step 604, based on selecting a frequency band that corresponds to a highest section of the frequency spectrum, the system may determine the size of the one or more convolutional filters to be 51×1. At half the frequency the system may upscale a 25×1 patch to 51×1 so that the respective convolutional filter is applied on a logarithmic scale. In some implementations the convolutional filters may be performed across time, and may therefore include more than one column.

The system processes the upscaled one or more frequency bands using the convolutional layer to generate a convolutional layer output (step 608). By processing the upscaled frequency bands, the system is able to learn a highest resolution convolution and apply the one or more convolutional filters on a logarithmic scale. The logarithmic convolutional mapping is applied uniformly across the whole frequency spectrum. In some implementations, the logarithmic convolutional mapping may be adjusted by tuning the base of the logarithm together with other convolutional layer hyperparameters.

The system receives a back-propagated gradient for the frequency domain features from a neural network layer above the convolutional layer (step 610). For example, the back-propagated gradient can be generated by computing the gradient for a top layer in the neural network and then backpropagating the computed gradient through the neural network layers using back-propagation techniques.

The system computes the gradient of an error function for the neural network with respect to the current convolutional layer filters (step 612). For example, in some implementations the error function may dependent on the one or more convolutional layer filters and the received back-propagated gradient.

The system updates the one or more convolutional layer filters using the computed gradient (step 614). For example, the system may update the values of a vector that fully specifies the convolutional layer filters using machine learning training techniques, e.g., by summing the gradient and the vector or by multiplying the gradient by a learning rate and then adding the product to the vector.

Figure 7:
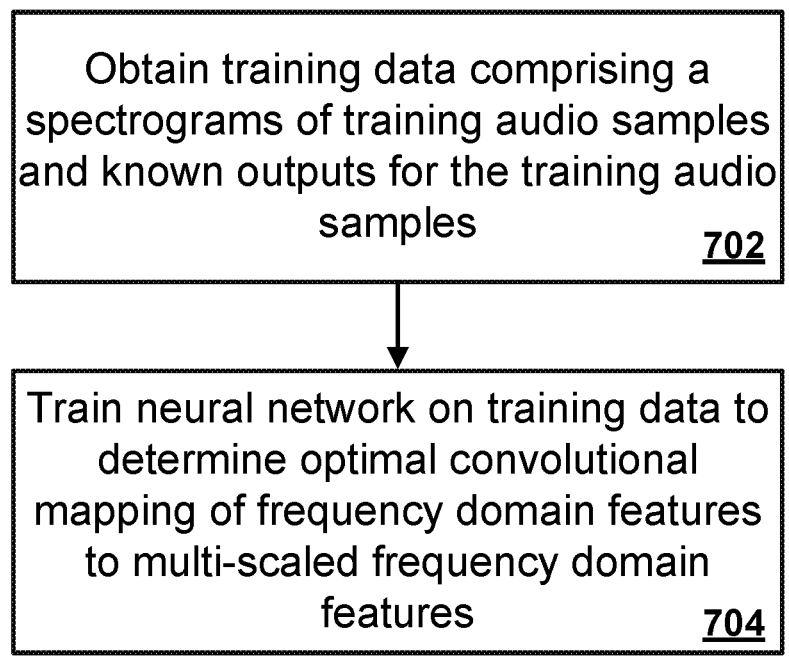
FIG. 7 is a flow diagram of an example process for training a cascaded convolutional neural network system.

FIG. 7 is a flow diagram of an example process 700 for training a cascade of convolutional neural network stages and one or more other neural network layer. For convenience, the process 700 will be described as being performed by a system of one or more computers located in one or more locations. For example, a neural network system that includes a cascade of convolutional stages, e.g., the cascaded convolutional neural network system 200 of FIG. 2, appropriately programmed in accordance with this specification, can perform the process 700.

The system obtains training data including, for each of a plurality of training audio samples, a spectrogram of the training audio sample and a known output for the training audio sample (step 702). In some implementations the training data may include time domain features of a training audio sample and a known classification for the training audio sample.

The system trains the neural network on the training data to adjust the values of the parameters of the other neural network layers and to adjust the values of the one or more convolutional layer parameters for the convolutional neural network layers in each convolutional neural network stage to determine a set of trained parameters (step 704). The system trains the neural network by processing the training data as input to the neural network to generate a training data neural network output, as described above with reference to FIG. 4.

In some implementations training the neural network system on the training data includes, for each convolutional layer in the sequence of convolutional stages in the first subnetwork, receiving a respective convolutional layer input, e.g., for a first convolutional neural network layer in a first convolutional stage receiving the spectrogram, or for a first convolutional layer in a second convolutional neural network stage receiving the first convolutional stage output. Training the neural network system may further include, for each convolutional layer in the first subnetwork, processing the received convolutional layer input through the convolutional layer to generate a convolutional layer output, e.g., as described above with reference to FIG. 4, receiving a back-propagated gradient for the spectrogram from a neural network layer above the convolutional layer, computing the gradient of an error function for the neural network, wherein the error function is dependent on the respective convolutional layer filters and the received back-propagated gradient and updating the respective convolutional layer filters using the computed gradient.

The trained parameters define an optimal convolutional mapping of frequency domain features to multi-scaled frequency domain features (step 706). The other neural network layers in the cascaded convolutional neural network system, e.g., the output layer, are able to select and use appropriate features from a concatenated convolutional neural network stage output, enabling the neural network system to tailor and optimize the convolutional mapping of frequency domain features to multi-scaled frequency domain features to the given task. For example, in some settings, e.g., speech recognition settings, a determined optimal convolutional mapping of frequency domain features to multi-scaled frequency domain features may include a convolutional mapping of frequency domain features to logarithmic or near logarithmic scaled frequency domain features.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., as a result of the user interaction, can be received from the user device at the server.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training a neural network that includes a plurality of neural network layers on training data,
    wherein the neural network is configured to receive linear scale frequency domain features of an audio sample and to process the frequency domain features to generate a neural network output for the audio sample,
    wherein the neural network comprises (i) an input convolutional layer that is configured to map linear scale frequency domain features to logarithmic scaled frequency domain features, wherein the mapping from linear scale frequency domain features to logarithmic scaled frequency domain features is defined by one or more convolutional layer filters of the input convolutional layer, and (ii) one or more other neural network layers having respective layer parameters that are configured to process the logarithmic scaled frequency domain features to generate the neural network output, and
    wherein the method comprises:
        obtaining training data comprising, for each of a plurality of training audio samples, linear scale frequency domain features of the training audio sample and a known output for the training audio sample; and
        training the neural network on the training data to adjust the values of the parameters of the other neural network layers and to adjust the one or more convolutional layer filters that define the mapping from linear scale frequency domain features to logarithmic scaled frequency domain features to determine an optimal logarithmic convolutional mapping of linear scale frequency domain features to logarithmic-scaled frequency domain features.

2. The method of claim 1, wherein the frequency domain features of the training audio sample reside in a frequency spectrum comprising a plurality of frequency bands.

3. The method of claim 2, wherein training the neural network on the training data comprises, for the convolutional layer:
    receiving the frequency domain features of the training audio sample;
    determining a size of each of the one or more convolutional layer filters;
    upscaling each of the plurality of frequency bands to match the determined size of the one or more convolutional layer filters;
    processing the one or more upscaled frequency bands using the convolutional layer to generate a convolutional layer output;
    receiving a back-propagated gradient for the frequency domain features from a neural network layer above the convolutional layer;
    computing the gradient of an error function for the neural network with respect to the one or more convolutional layer filters, wherein the error function is dependent on the one or more convolutional layer filters and the received back-propagated gradient; and
    updating the one or more convolutional layer filters using the computed gradient.

4. The method of claim 3, wherein determining a size of each of the one or more convolutional layer filters comprises:

selecting, from the plurality of frequency bands, a frequency band that corresponds to a highest frequency section of the frequency spectrum; and determining the size of each of the one or more convolutional layer filters based on the selected frequency band that corresponds to the highest frequency section of the frequency spectrum.

5. The method of claim 3, wherein determining a size of each of the one or more convolutional layer filters comprises determining a predetermined size of each of the one or more convolutional layer filters.

6. The method of claim 3, wherein upscaling the one or more frequency bands to match the determined size of the one or more convolutional layer filters comprises upscaling the one or more frequency bands using interpolation methods.

7. A method for processing data input through each of a plurality of layers of a neural network,
wherein the neural network is configured to receive linear scale frequency domain features of an audio sample and to process the frequency domain features to generate a neural network output for the audio sample,
wherein the neural network comprises (i) a convolutional layer that is configured to map linear scale frequency domain features to logarithmic scaled frequency domain features, wherein the mapping from linear scale frequency domain features to logarithmic scaled frequency domain features is defined by one or more convolutional layer filters of the convolutional layer, and (ii) one or more other neural network layers having respective layer parameters that are configured to process the logarithmic scaled frequency domain features to generate the neural network output, and
wherein the method comprises:
obtaining data input comprising linear scale frequency domain features of an audio sample;
processing the linear scale frequency domain features using the convolutional layer to generate a convolutional layer output, wherein the convolutional layer output comprises logarithmic-scaled frequency domain features; and
processing the generated convolutional layer output using the one or more other neural network layers to generate a neural network output.

8. The method of claim 7, wherein processing the linear scale frequency domain features using the convolutional layer to generate a convolutional layer output, wherein the convolutional layer output comprises logarithmic-scaled frequency domain features, comprises:
receiving, at the convolutional layer, the frequency domain features, wherein the frequency domain features reside in a frequency spectrum comprising one or more frequency bands;
for each frequency band, downscaling a size of a respective convolutional filter based on the frequency band;
processing the one or more frequency bands using the downscaled one or more convolutional filters to generate the convolutional layer output.

9. A system comprising one or more computers and one or more storage devices storing instructions that when executed by the one or more computers cause the one or more computers to perform operations to implement:
a neural network system, the neural network system comprising a plurality of neural network layers, wherein the neural network system is configured to obtain a linear scale spectrogram of an audio sample and to process the linear scale spectrogram to generate a neural network output for the audio sample, the plurality of neural network layers comprising:
a first subnetwork comprising a sequence of plurality of convolutional neural network stages configured to perform a convolutional mapping of linear scale frequency domain features to multi-scale frequency domain features,
wherein each convolutional neural network stage in the sequence of convolutional neural network stages comprises one or more convolutional neural network layers each having respective convolutional layer parameters,
where (i) a first convolutional neural network stage in the sequence of convolutional neural network stages is configured to obtain the linear scale spectrogram of the audio sample and generate a first convolutional output, and (ii) each subsequent convolutional neural network stage in the sequence of convolutional neural network stages is configured to:
receive one or more vector inputs from a preceding convolutional neural network stage;
reduce the size of the received one or more vector inputs by a factor of two to generate a respective convolutional neural network stage output that includes one or more vectors of reduced sizes, each size representing a specific feature scale; and
provide the respective convolutional neural network stage output to a subsequent neural network layer for processing,
a second subnetwork comprising other neural network layers, the other neural network layers comprising at least (i) a hidden neural network layer and (ii) an output layer, each having respective layer parameters,
wherein (i) the hidden neural network layer is configured to receive a combination of all of the convolutional neural network outputs generated by the convolutional neural network layers in the sequence of convolutional neural network layers and generate a hidden neural network layer output, (ii) the output layer is configured to receive an output derived from the hidden neural network output and generate the neural network output for the audio sample, and
wherein the neural network system is trained on training data to adjust the values of the layer parameters of the other neural network layers and to adjust the one or more respective convolutional layer parameters to determine an optimal convolutional mapping of linear scale frequency domain features to multi-scale frequency domain features.

10. The system of claim 9, wherein the first convolutional neural network stage is configured to:
receive the spectrogram of the audio sample, wherein the spectrogram comprises a plurality of rows corresponding to frequency bands and a plurality columns corresponding to time bands;
compress a time band of height H by length L to one or more vectors of size H by one; and
provide the one or more vectors of size H by one to a subsequent convolutional neural network stage in the sequence of convolutional neural network stages for processing.

11. The system of claim 9, wherein convolutional layer parameters included in the subsequent convolutional neural network stages comprise convolutional layer filters of height 3 and row stride 2.

12. The system of claim 9, wherein each subsequent convolutional neural network stage comprises at least (i) a 1×1×2 convolutional layer with row stride of 1 followed by a max pooling layer with row stride 2, (ii) a 3×1×D convolutional layer, and (iii) a 3×1×D depthwise-separable convolution with row stride 1 followed by a max pooling layer with row stride 2, wherein D represents a convolutional layer filter depth.

13. The system of claim 12, wherein each subsequent convolutional neural network stage comprises rectified linear units.

14. The system of claim 9, wherein the hidden neural network layer is configured to receive a row concatenation of each generated convolutional stage output.

15. The system of claim 9, wherein the hidden neural network layer is configured to receive an output corresponding to a final convolutional in the sequence of convolutional neural network stages.

16. The system of claim 15, wherein a depth of each convolutional neural network layer in the sequence of convolutional neural network stages increases through the sequence of convolutional neural network stages.

17. The system of claim 9, wherein a depth of each convolutional neural network layer in the sequence of convolutional neural network stages is greater than one.

18. The system of claim 9, wherein training comprises:
obtaining training data comprising, for each of a plurality of training audio samples, a linear scale spectrogram of the training audio sample and a known output for the training audio sample; and
training the neural network on the training data to adjust the values of the parameters of the layers of the second subnetwork and to adjust the one or more convolutional layer parameters to determine the optimal convolutional mapping of linear scale frequency domain features to multi-scale frequency domain features, wherein training comprises, for each convolutional layer in the subnetwork:
receiving a respective convolutional layer input;
processing the received convolutional layer input through the convolutional layer to generate a convolutional layer output;
receiving a back-propagated gradient for the linear scale spectrogram from a neural network layer above the convolutional layer;
computing the gradient of an error function for the neural network, where the error function is dependent on the respective convolutional layer parameters and the received back-propagated gradient; and
updating the respective convolutional layer parameters using the computed gradient.

* * * * *

UNITED STATES PATENT AND TRADEMARK OFFICE
CERTIFICATE OF CORRECTION

PATENT NO. : 10,460,747 B2  
APPLICATION NO. : 15/151362  
DATED : October 29, 2019  
INVENTOR(S) : Roblek et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this
Eleventh Day of August, 2020

Andrei Iancu
*Director of the United States Patent and Trademark Office*